United States Patent [19]

Andersson

[11] 4,064,615

[45] Dec. 27, 1977

[54] METHOD AND DEVICE FOR DISMOUNTING OR MOUNTING JIB SECTIONS ON A TOWER CRANE

[75] Inventor: Rickard Andersson, Vasteras, Sweden

[73] Assignee: Linden-Alimak AB, Vasteras, Sweden

[21] Appl. No.: 736,458

[22] Filed: Oct. 28, 1976

[51] Int. Cl.[2] ......................... B23P 19/00; B23P 11/00

[52] U.S. Cl. ......................................... 29/426; 29/431; 212/46 R; 212/144; 52/122

[58] Field of Search ...................... 29/155 R, 426, 431, 29/468, 469; 52/122, 123, 745; 212/1, 46 R, 46 A, 46 B, 144; 294/67 R, 67 A

[56] References Cited

U.S. PATENT DOCUMENTS

| | | | |
|---|---|---|---|
| 3,426,914 | 2/1969 | Waleson et al. | 212/144 |
| 3,438,160 | 4/1969 | Gostling | 52/122 |
| 3,450,280 | 6/1969 | Colnot | 294/67 R |
| 3,793,702 | 2/1974 | Ahlgren | 29/426 |
| 3,888,356 | 6/1975 | Redelfs | 212/144 |

*Primary Examiner*—Lowell A. Larson

*Attorney, Agent, or Firm*—Wegner, Stellman, McCord, Wiles & Wood

[57] ABSTRACT

The invention relates to a method of dismounting or mounting jib sections on a tower crane, at which a carrying cradle with counterweight and having the form of a three-armed lever is used for lowering or hoisting jib sections to be dismounted and mounted, respectively, and the cradle is so designed as to during the lowering and hoisting operations, respectively, to assume suitable balanced positions.

11 Claims, 12 Drawing Figures

METHOD AND DEVICE FOR DISMOUNTING OR MOUNTING JIB SECTIONS ON A TOWER CRANE

This invention relates to a method and a device for dismounting or mounting jib sections on a tower crane.

A tower crane for construction purposes generally comprises a vertical mast assembled of sections and a horizontal jib also assembled of sections and slewingly supported at the upper mast end.

On said jib a trolley is provided, which is movable in the longitudinal direction of the jib and from which ropes suspend to a block with a hook. The building structure gaining in height, the mast of the tower crane is extended by jointing further mast sections. During a certain construction period also the reach of the crane may be required to be longer, which is satisfied by extending the jib with one or more jib sections. It may as well be necessary to reduce the length of the jib, for being able to carry out work when, for example, adjoining buildings obstruct the slewing movement of the crane.

Heretofore the length of a jib most usually was extended or reduced by means of a mobile crane, which hoisted or lowered one or more mast sections. This method, however, is expensive and cannot always be applied for example not when a crane is raised from one floor to the next higher one in a high building, or when a crane has a very great height, and its mast was extended by means of a raising equipment of its own. At modern construction work, however, also the length of jibs of such cranes is required to be extended or shortened during a certain construction period.

The present invention has the object of providing a method and a device, which render it possible to extend or reduce the length of a jib on a tower crane irrespective of the height of the crane and without the use of other cranes.

This object is achieved by a method and a device, which show the characterizing features defined in the attached claims.

Figure 1:
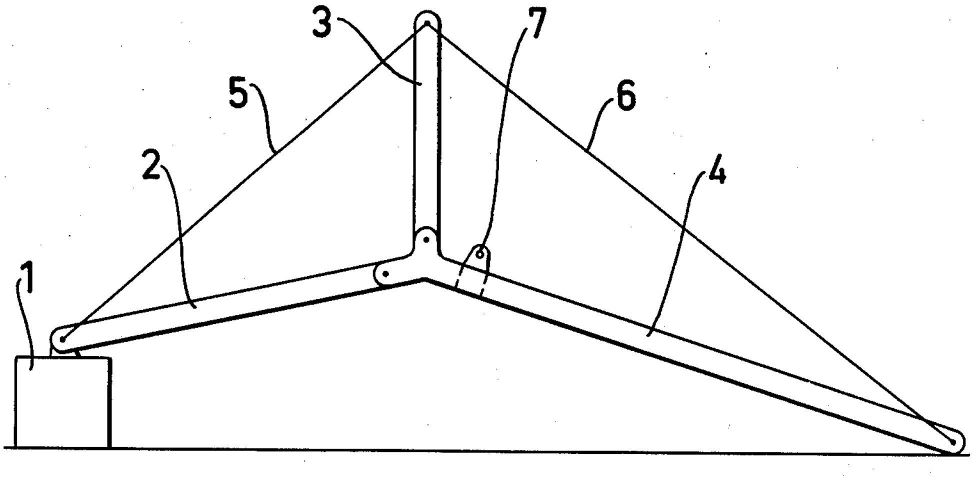
Figure 2:
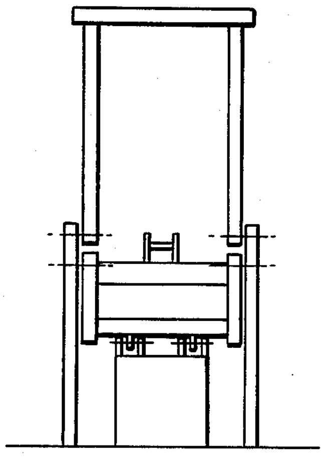
Figure 3:
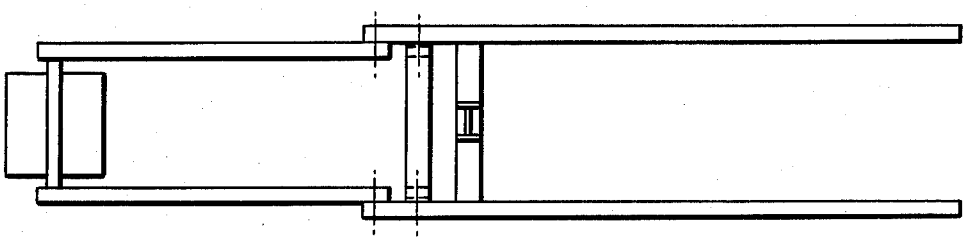
Figure 4:
Figure 5:
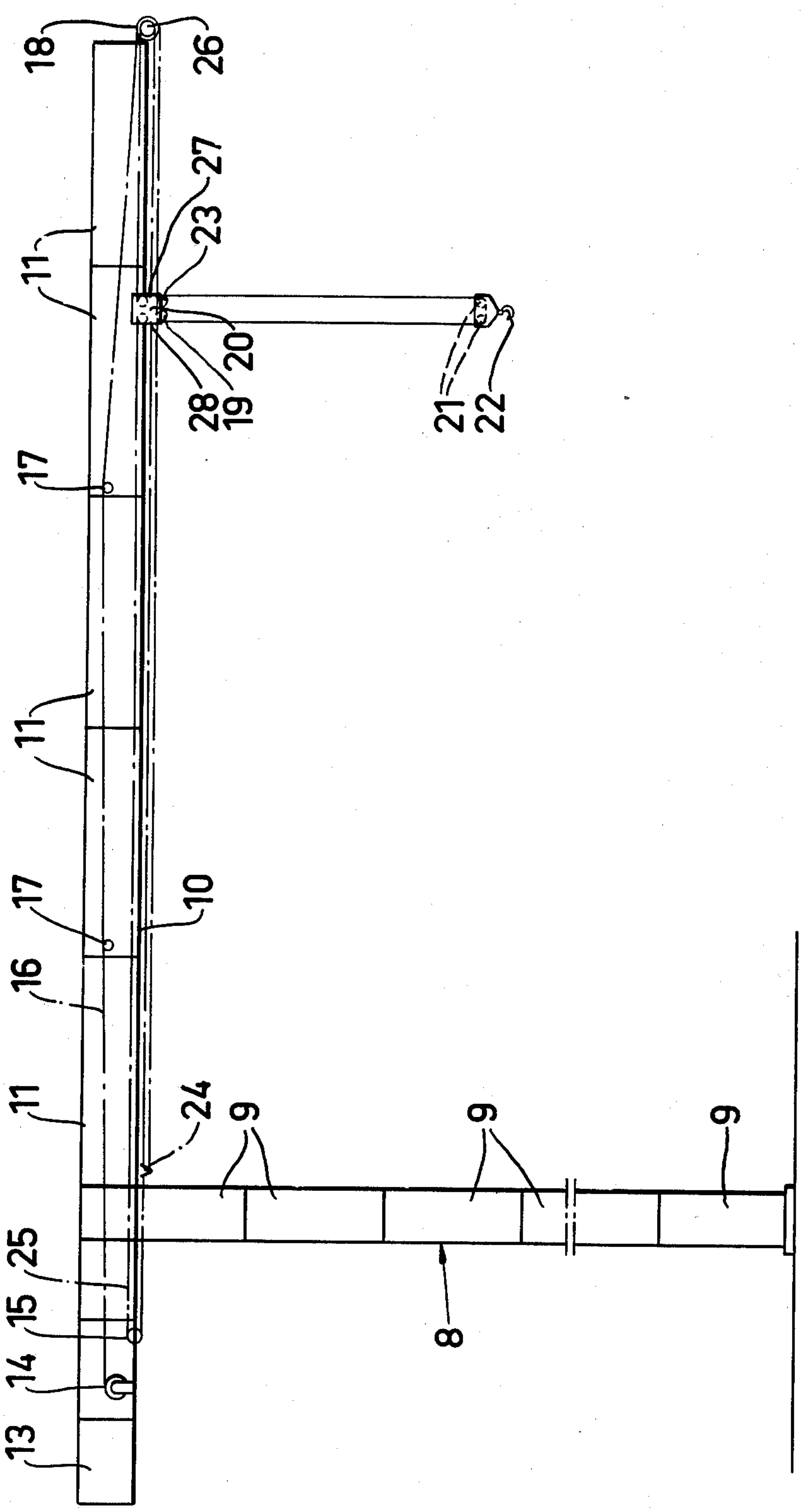

An embodiment of the invention is described in the following, with reference to the accompanying drawings, in which FIG. 1 is a lateral view of a carrying cradle with a counterweight according to the invention, FIG. 2 is an end view of the device according to FIG. 1, FIG. 3 is a horizontal view of the device according to FIG. 1, FIG. 4 shows the carrying cradle in folded transport position, FIG. 5 is a lateral view of a tower crane, and FIGS. 6–12 show different phases of the dismounting or mounting of a jib section.

FIGS. 1–4 show the carrying cradle, comprising a counterweight 1, which may be the normal test load weight of the crane and is pivotally connected to a frame 2, which in its turn is hingedly coupled together with a frame 3 and a bow-shaped frame 4. Stay ropes 5 and 6 are stretched between the outer ends of the frames. Adjacent the joining point of the frames mounting lugs for an axle 7 for connection to the hook are provided.

FIG. 5 is a lateral view of a tower crane. A mast 8 is assembled of a plurality of mast sections 9. At the upper end of the mast a jib 10 is slewingly supported which consists of a plurality of sections 11. In the extension of the jib a counterjib is provided, which carries a counterweight 13, a hoisting machinery 14 and a trolley machinery 15. A hoisting rope 16 runs in conventional manner over supporting pulleys 17 and an end section pulley 18, further over a sheave 19 on a trolley 20 and over sheaves 21 in a block with a hook 22, from where the rope runs back to a sheave 23 on the trolley and thereafter in the longitudinal direction of the jib to a point 24 near the connection of the jib 10 to the mast 8 where the end of the hoisting rope 16 is anchored.

From the trolley machinery 15 extends in conventional manner an upper strand of a rope 25, which runs along the jib 10, is deflected over an end section pulley 26 and beneath the jib joins the trolley by means of an anchorage 27. From the trolley machinery, furthermore, extends the lower strand of said rope 25, which by means of an anchorage 28 is connected to the opposite side of the trolley 20. The FIGS. 6–12 show different phases of the dismounting and mounting of a jib. In the following, a dismounting operation is described. As a first step, the hoisting rope 16 and the trolley rope 25 must be separated from the jib section. This is effected thereby, that the ropes are moved from the jib section over to a sheave block 29, which is attached for this occasion and connected to the outer end of the most adjacent jib section. The sheave block 29 is lifted from the ground plane by means of the bow structure.

Figure 6:
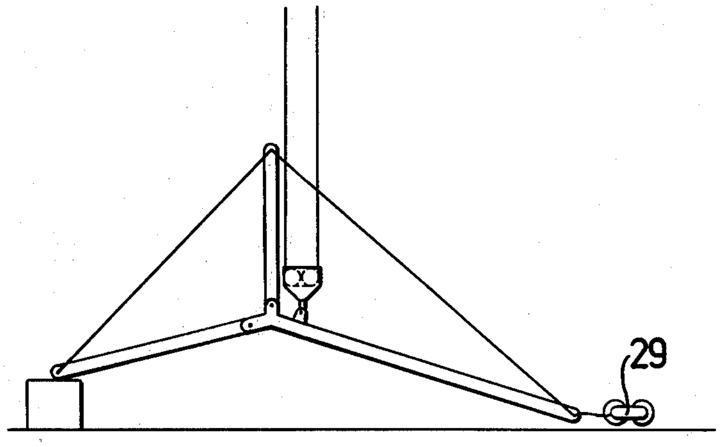

FIG. 6 shows how the carrying cradle with counterweight on the ground plane has been connected to the sheave block 21 suspended on the hoisting ropes from the trolley of the crane. To the end of the bow-shaped frame 4 the sheave block 29 has been connected.

Figure 7:
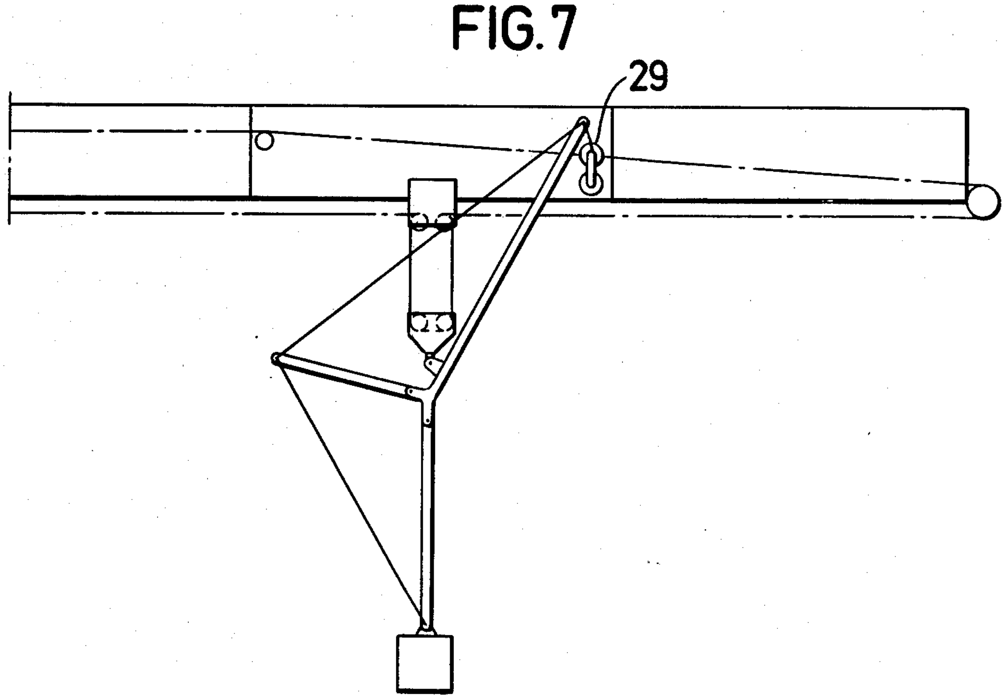

FIG. 7 shows the carrying cradle in a hoisted position, at which the sheave block 29 by action of the counterweight 1 is swung upward to an operation height where it easily can be moved into the jib 10 and be anchored. The carrying cradle is thereafter lowered to the ground, whereafter the hoisting rope 16 and trolley rope 25 are moved from the end section pulleys 18 and 26 over to the sheave block 29.

Figure 8:
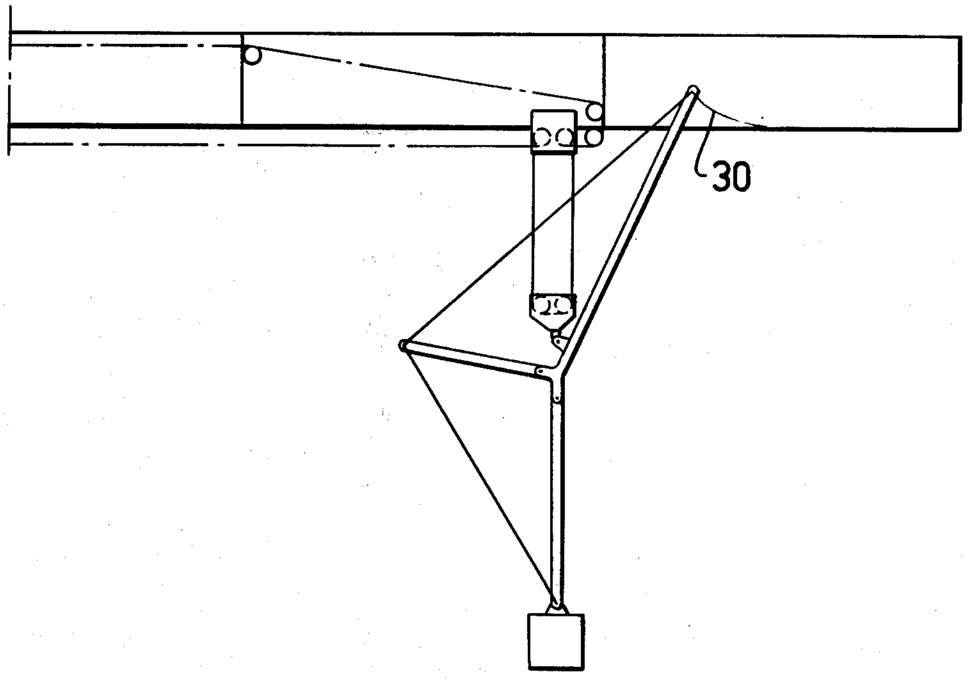

The carrying cradle is thereafter hoisted to the position shown in FIG. 8. Thereafter an outer hoisting loop 30 is coupled between the ends of the bow-shaped frame 4 and the jib section to be dismounted.

During the continued hoisting operation, the carrying cradle by action of the hoisting loop 30, which is connected to the jib 10 and stretched, is raised until contact is established between the frame 3 and the lower surface of the jib 10.

Figure 9:
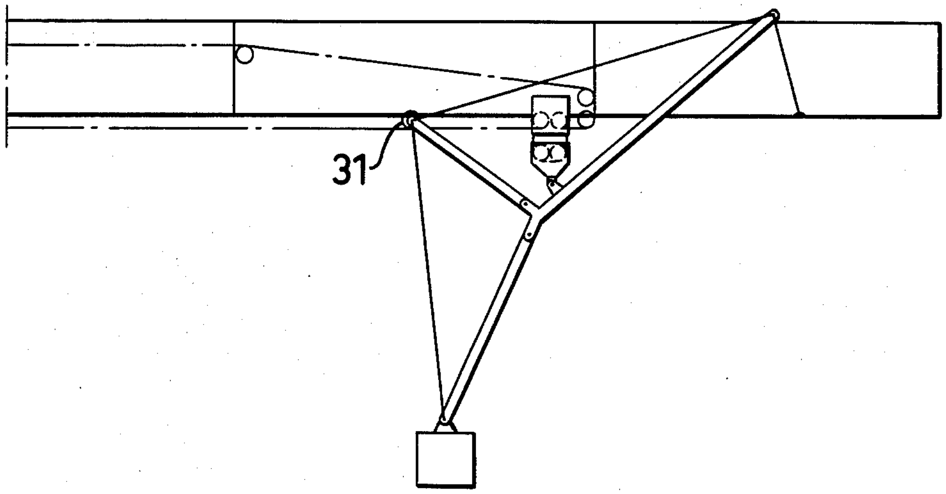

FIG. 9 shows how thereafter the frame 3 is attached rotatably to the jib by means of a loop 31. During a subsequent lowering operation, the carrying cradle is rotated about its attachment to the jib 10 whereby the outer hoisting loops 30 are so slackened that also the inner hoisting loops 32 can be coupled between the bow-shaped frame and the jib section.

The hoisting loops are stretched by a hoisting movement whereafter the loop 31 can be detached. It appears from FIG. 10 how the load from the jib section at an additional hoisting operation by means of the hoisting loops 30 and 32 is transferred to the carrying cradle, so that the section can be released from the remaining part of the jib.

As the lowering operation thereafter continues, the balanced position of the carrying cradle changes until the frame 3 and the jib 10 no longer are in contact with one another.

Figure 11:
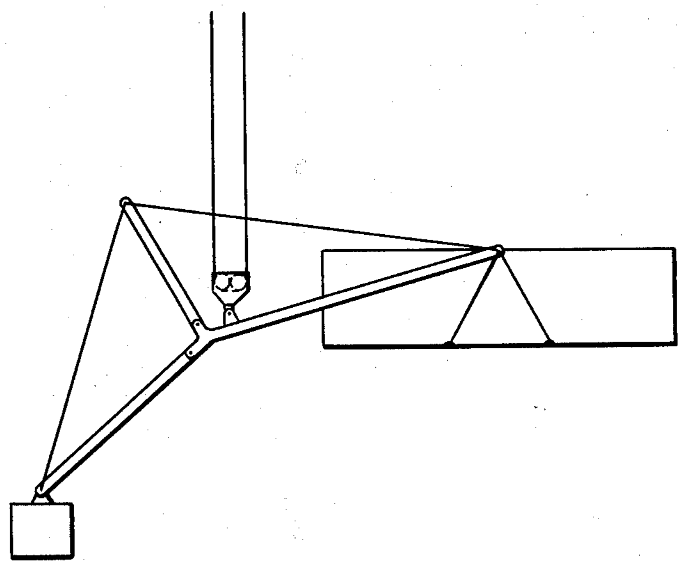
Figure 12:
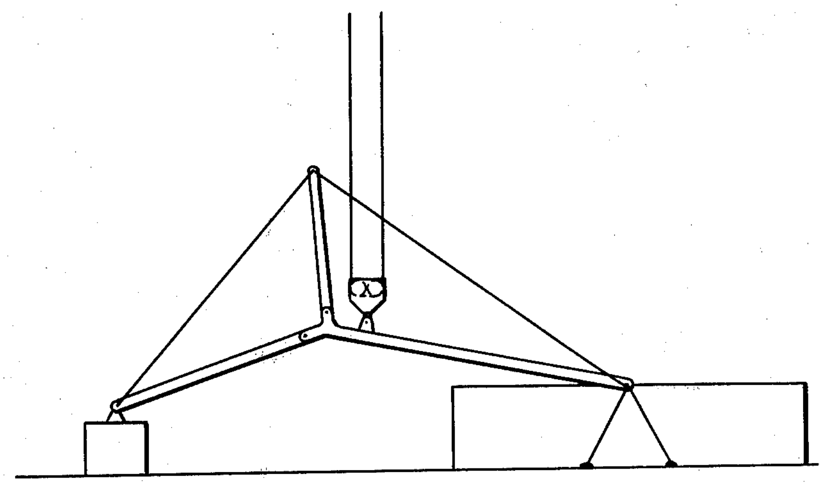

The counterweight 1 is so dimensioned in relation to the weight of a jib section that the balanced position shown in FIG. 11 is maintained during the remaining part of the lowering operation until the counterweight 1 of the carrying cradle reaches the ground. Thereafter a rotary movement about the pivot point at the counterweight takes place, and the jib section can be put down as shown in FIG. 12.

Further jib sections can be dismounted in the same way by repeating the procedure.

For extending a jib, a section instead is mounted on the outer end of the jib 10. As in the case of dismounting, first a sheave block 29 is attached temporarily to the outer end of the outermost section and hoisted by means of the carrying cradle. The cradle again is lowered whereafter the ropes 16 and 25 are moved over to the block 29. The lowered cradle is coupled together with the jib section to be mounted, as illustrated in FIG. 12. Upon the subsequent hoisting of the section, the carrying cradle as in the case of its lowering assumes a balanced position, as shown in FIG. 11.

Figure 10:
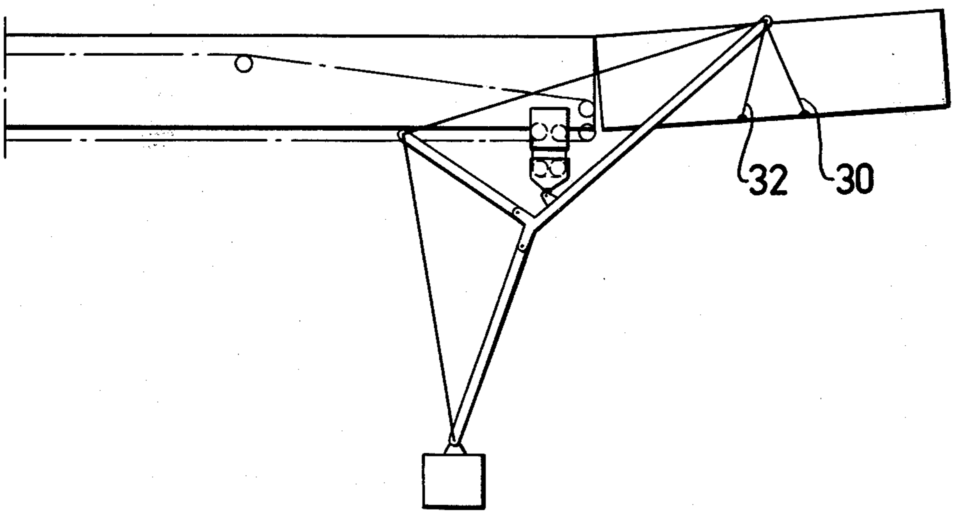

When the carrying cradle with the section has been hoisted such a distance that the position shown in FIG. 10 has been reached, the frame 3 is attached rotatably to the jib by means of a loop 31, and the hoisted section besides is attached at its upper edge to the outermost section, as in FIG. 9 The carrying cradle now is lowered slightly so that the inner hoisting loop 32 slackens and can be detached, whereafter the cradle again is hoisted to the position shown in FIG. 9. The loop 31 is thereafter removed, and the cradle is lowered while simultaneously the loop 30 is removed.

When the section, which at the occasion in question is the last section, has been dismounted or mounted, the temporary sheave block 29 is replaced by the normal end section pulleys 18 and 26.

The invention, of course, is not restricted to the embodiment described above, but can freely be varied within the scope of the attached claim.

What is claimed is:

1. A method for dismounting and mounting jib sections on a tower crane having a jib, a hook, a hoisting rope and a trolley rope passing over a pulley carried by said jib section, the dismounting steps comprising connecting said hook to a carrying cradle having a counterweight on one arm of a three-armed lever frame, connecting a sheave block on another of the frame arms and hoisting said cradle, said cradle assumes a balanced position as it is hoisted with the frame arm carrying the counterweight substantially pointing in vertical downward direction, with the frame arm carrying the sheave block and intended to carry the section to be dismounted pointing upward, hoisting said cradle until said sheave block has reached a position above the lower edge of a second jib section located adjacent to said first-named jib section, disconnecting said sheave block from said cradle and connecting same to said second jib section, lowering the cradle to the ground level, moving the hoisting rope and trolley rope from the pulley on the first-named jib section to said sheave block on said second jib section, hoisting the cradle until a short frame arm of the cradle abuts the lower side of the jib and the outer end of the frame arm is on the same level as the upper edge of the first-named jib section, connecting said another frame arm to said first-named jib section, additional hoisting of the cradle lifts the first-named jib section so that the first-named jib section can be released from said second jib section, lowering of the carrying cradle with the first-named jib section during which lowering the cradle assumes a different balanced position where the short frame arm no longer abuts the lower side of the jib, but where the outer end of the another frame arm still is above the carrying cradle arm provided with the counterweight, so that the counterweight at continued lowering first establishes contact with the ground lever, and thereafter a rotation of the carrying cradle about said counterweighted end takes place until the jib section has established contact with the ground level, and the mounting steps comprising coupling the another frame arm with the jib section to be mounted, hoisting of the carrying cradle with the jib section during which hoisting the cradle assumes a balanced position where the outer end of the another frame arm is located above the counterweight, hoisting said cradle and jib section until contact of the short frame arm with the lower side of the jib is affected whereby a rotation of the cradle about this point of contact takes place until the jib section to be mounted has arrived at the necessary level, coupling the jib section with the remaining jib, releasing the carrying cradle from the jib section and lowering same while the cradle assumes a different balanced position, at which the frame arm with the counterweight substantially points vertically downward, until the carrying cradle reaches ground level, moving the hoisting rope and trolley rope from a pulley on the jib to a pulley on the jib section and that this dismounting and mounting procedure continues until the jib has obtained the desired length.

2. A carrying cradle with counterweight to dismount a jib section on a tower crane comprising a jib, a hook, a hoisting rope and a trolley rope, the hoisting rope and trolley rope are movable from a pulley on the jib section to a temporary sheave block attached to the section of the jib located adjacent the section to be dismounted, characterized in that the cradle has the form of a three-armed lever frame, and a counterweight carried by one of the arms.

3. A carrying cradle according to claim 2, characterized in that one of the arms has bow-shape.

4. A carrying cradle according to claim 2, characterized in that the arms forming the carrying cradle are hingedly jointed.

5. A carrying cradle according to claim 4, characterized in that the hinged arms are fixed in position relative to each other by means of stay ropes.

6. A carrying cradle according to claim 4, characterized in that the hinged arms are foldable to transport position.

7. A carrying cradle according to claim 2, characterized in that a hoist lug is carried by the cradle, the hook of the tower crane is connected to said lug for raising and lowering the cradle.

8. In an extendible and retractable jib of a tower crane comprising, a jib having a plurality of joined together jib sections including an outermost jib section, a hook carried by said jib, a hoisting rope and a trolley rope operatively connected to said hook for raising and lowering said hook and for moving said hook along said jib, a pulley on the outer end of said outermost jib section over which said hoisting rope and said trolley rope pass, in combination, a carrying cradle for mounting and dismounting said outermost jib section, said carrying cradle comprising a three-armed lever frame, a first of said arms having a diverging pair of stub shafts on one end thereof, a second arm connected to one of said stub shafts and pivotally supporting a counterweight at the outer end portion thereof, a third of said arms connected to the other of said stub shafts and extending upwardly from said first arm, a mounting bracket carried by said first arm near said connection of said three arms, stay means connecting the outer ends of said three arms to form said cradle, means for supporting a temporary sheave block on the outer end of said first arm, said hook on said tower engaging with the bracket on said first arm whereby the cradle may be raised, said counterweight pivoting said cradle to raise said first arm into the air and to position said sheave block at the outer end of a jib section next to the outermost jib section, said sheave block being connected to said last-named jib section, said hoisting rope and trolley rope being movable from said pulley to said sheave block, a hoisting loop on the outer end of said first arm engaging with said outermost jib section, whereby lifting said carrying cradle contacts said third arm with said jib to lift the outermost jib section whereupon the outermost jib section can be disconnected from the jib and can be lowered to the ground.

9. In a tower crane having an extendible and retractable jib comprising, a jib having a plurality of joined together jib sections including an outermost jib section and a second jib section adjacent said outermost jib section, a hook carried by said jib, a hoisting rope and a trolley rope operatively connected to said hook for raising and lowering said hook and for moving said hook along said jib, a pulley on the outer end of said outermost jib section over which said hoisting rope and said trolley rope pass, in combination, a carrying cradle for mounting and dismounting said outermost jib section, said carrying cradle having a three-armed lever frame, a first of said arms having a pair of diverging stubs carried by one end portion thereof, a second arm pivotally supported on one of said stubs and having a pivotally supported counterweight at the outer end portion thereof, a third of said arms pivotally connected to the other of said stubs and extending upwardly from said first and second arms, said first arm having a mounting bracket near said connection of said three arms, and means connecting the outer ends of said three arms to form said cradle, said hook on said tower engaging with the bracket on said cradle whereby the cradle either may be raised to disconnect and lower said outer most jib section or may raise said outermost jib section and connect it to said second jib section.

10. A method for dismounting an outermost jib section from a jib of a tower crane comprising the steps of connecting a three-armed carrying cradle to a hook connected to said jib by a hoisting rope, a sheave block connected to one of the arms of said carrying cradle remote from a second arms supporting a counterweight, hoisting said hook and carrying cradle whereby the counterweight tilts the carrying cradle to a vertical position with the sheave block raised to a position above said hook, continuing to hoist said cradle to a position close to a second jib section, connecting said sheave block to said second jib section, removing the hoisting rope and a trolley rope from a pulley on the outermost jib section and connecting same to said sheave block on said second jib section, lowering said carrying cradle to the surface and connecting a hoisting loop to said second arm, raising said carrying cradle whereby the counterweight elevates said second arm and hoisting loop to a position above said outermost jib section, connecting said hoisting loop to said outermost jib section, raising and carrying cradle to engage a third arm of said carrying cradle with the under portion of said jib, further raising and carrying cradle to cant the outermost jib section relative to said jib, disconnecting said outermost jib section from said second jib section, lowering the carrying cradle and outermost jib section to the ground whereby said tower crane can be operated without said outermost jib section.

11. A method for mounting an outermost jib section to a jib of a tower crane having a mast supporting said jib and a hook carried by said jib being movable up and down and back and forth on said jib by a hoisting rope and a trolley rope, said method comprising the steps of connecting said hook to a first arm of a three-armed carrying cradle having a counterweight on a second of said arms, connecting an outermost jib section to said first arm, hoisting said hook and carrying cradle whereby the counterweight rotates the cradle and substantially balances the weight of the outermost jib section at a level above said counterweight, hoisting said cradle until a third arm engages the underside of said jib, continued hoisting of the cradle aligns the outermost jib section with a second jib section, connecting said outermost jib section to said second jib section, lowering said cradle slightly and disconnecting said cradle from said outermost jib section, lowering said cradle to the surface whereby said counterweight contacts th ground first and said cradle rotates until the second arm contacts the surface, and removing the hoisting rope and trolley rope from a sheave block on the second jib section and connecting same to a pulley on said outermost jib section.

* * * * *